United States Patent [19]

Panagopoulos Jr., et al.

[11] Patent Number: 5,455,303

[45] Date of Patent: Oct. 3, 1995

[54] LINEAR LOW DENSITY POLYETHYLENE BASED COMPOSITIONS WITH IMPROVED OPTICS

[75] Inventors: George Panagopoulos, Jr., Wilmington, Del.; Camillo Cagnani, Dovadola; Claudio Cometto, Bologna, both of Italy

[73] Assignee: Montell North America Inc., Wilmington, Del.

[21] Appl. No.: 262,803

[22] Filed: Jun. 20, 1994

[51] Int. Cl.⁶ .......................... C08L 23/16; C08L 23/06; C08L 23/20; C08L 53/00
[52] U.S. Cl. ...................... 525/95; 525/240; 525/88
[58] Field of Search .................. 525/240, 95, 88

[56] References Cited

U.S. PATENT DOCUMENTS

| | | | |
|---|---|---|---|
| 4,438,238 | 3/1984 | Fukushima et al. | |
| 4,459,385 | 7/1984 | McCullough | 525/88 |
| 4,493,923 | 1/1985 | McCullough | 525/95 |
| 4,535,125 | 8/1985 | McCullough | 525/88 |
| 4,540,416 | 9/1985 | Hattori et al. | 525/240 |
| 4,563,504 | 1/1986 | Hert et al. | 525/240 |
| 4,565,847 | 1/1986 | Bahl et al. | 525/240 |
| 4,587,303 | 5/1986 | Turtle | |
| 4,748,206 | 5/1988 | Nogiwa et al. | 525/240 |
| 4,871,813 | 10/1989 | Senez | 525/240 |
| 5,210,167 | 5/1993 | Firdaus et al. | |
| 5,277,988 | 1/1994 | Sugi et al. | 525/240 |
| 5,328,734 | 7/1994 | Seguela et al. | 525/240 |

FOREIGN PATENT DOCUMENTS

| | | |
|---|---|---|
| 0525767 | 2/1993 | European Pat. Off. |
| 59-202244 | 11/1984 | Japan |

*Primary Examiner*—Carman J. Seccuro, Jr.

[57] ABSTRACT

Disclosed is a polymer composition of (A) a polyolefin composition consisting essentially of (i) a linear low density polyethylene and (ii) a copolymer of propylene with ethylene and/or a $C_4$–$C_8$ α-olefin, where R is an alkyl radical having 2 to 10 carbon atoms and (B) a low density polyethylene.

9 Claims, No Drawings

LINEAR LOW DENSITY POLYETHYLENE BASED COMPOSITIONS WITH IMPROVED OPTICS

FIELD OF THE INVENTION

The present invention relates to a polymer composition based on linear low density polyethylene (LLDPE). In particular, this invention relates to a polymer composition of a linear low density polyethylene and a copolymer of propylene with ethylene and/or $C_4$–$C_8$ α-olefin.

BACKGROUND OF THE INVENTION

LLDPE polyethylene finds various applications and it is used in particular for the preparation of films. This is because compared to the films obtained from conventional low density polyethylene (LDPE), LLDPE films offer better mechanical properties.

However, the production of LLDPE films presents some difficulties due mainly to the fact that the polymer does not possess a sufficiently high melt strength in the molten state, and in said molten state its viscosity is rather significant.

In order to maintain unaltered the productivity of the film extruders, they have to be modified, for example the slit of the extruder's die has to be made wider, or the temperature of said die has to be increased.

These modifications cause difficulties related with the cooling of the blown bubble at the extruder's output and a film thickness which is not homogeneous.

Moreover, the LLDPE film heat-seal does not offer good heat resistance.

In order to overcome the above inconveniences, U.S. Pat. No. 4,871,813 discloses modifying LLDPE by blending a semicrystalline copolymer of propylene with a $CH_2$=CHR α-olefin, where R is an alkyl radical having from 2 to 10 carbon atoms, and optionally ethylene in quantities of less than 10%. The ethylene content must always be lower than that of the α-olefin. The propylene copolymer contains from 7 to 40% by weight of α-olefin, presents a melt enthalpy lower than 75 J/g, and is added in quantities ranging from 1 to 25% by weight. Moreover, the propylene copolymers described in said patent are characterized by a particularly irregular molecular structure due to the good randomization of the comonomer and the low isotactic index. In particular, the isotactic index determined by measuring the solubility in n-heptane is lower than 65. The degree of crystallinity of the propylene copolymer is low, and less than 35%, generally ranging from 10 to 30%.

The LLDPE and propylene copolymer blend is prepared by blending the melted components in an extruder and then pelletizing the resulting product, or the mixture of the solid components, and the feeding of said mixture directly in the extruder to form the finished product.

The compositions obtained in this manner offer improved processability, and heat resistance during heat-sealing. However, little, if any, substantial change is seen in the mechanical properties.

European Patent Application 0 525 767 discloses a process for the preparation of LLDPE with improved processability by sequential polymerization in two or more gas-phase reactors equipped either with a fluid or mechanically stirred bed. According to said process, in one of the reactors ethylene and $CH_2$=CHR α-olefin, where R is an alkyl radical having 1 to 10 carbon atoms, are polymerized to form linear low density polyethylene (LLDPE), and in another reactor propylene and a $CH_2$=CHR α-olefin, where R is an alkyl radical having 2 to 10 carbon atoms, are polymerized to form a crystalline propylene copolymer having a melt enthalpy higher than 70 J/g. Compared with the mechanical blends described above, the compositions thus obtained are more homogeneous and have improved optical properties.

SUMMARY OF THE INVENTION

Now it has been found that LLDPE having improved processability and, at the same time, improved optical properties, i.e. haze, and gloss, and impact resistance can be obtained by blending a small amount of a low density polyethylene (LDPE) with a composition consisting essentially of a linear low density polyethylene and a copolymer of propylene with ethylene and/or a $C_4$–$C_8$ α-olefin having particular xylene insolubility characteristics.

Unexpectedly it was found that both impact resistance and tear strength of the polymer compositions obtained by blending a LDPE with a reactor produced composition of an LLDPE and a crystalline copolymer of propylene with ethylene and/or a $C_4$–$C_8$ α-olefin are far superior than those of the similar unmodified LLDPE or blends thereof with LDPE.

Accordingly, the present invention provides a polymer composition produced by sequential polymerization in at least two stages consisting essentially of:
(A) from 99.5 to 95% by weight of a polyolefin composition consisting essentially of:
  (i) from 95 to 75%, by weight, of a linear low density polyethylene containing up to 20%, by weight, of a $C_{4-8}$ α-olefin having a density of from 0.88 to 0.945 g/cm$^3$ and a melt index of from 0.1 to 10 g/min, and
  (ii) from 5 to 25%, by weight, of a copolymer of propylene with ethylene or a $C_4$–$C_8$ α-olefin containing from 60 to 95% of propylene, or a copolymer of propylene with ethylene and a $C_4$–$C_8$ α-olefin containing from 2 to 10% ethylene and 2 to 10% $C_4$–$C_8$ α-olefin, wherein said polyolefin composition has a melt index of 0.1 to 5.0 g/10 min and a density of 0.900 to 0.925 g/cm$^3$; and (B) from 0.5 to 5%, by weight, of a low density polyethylene having a density of 0.916 to 0.925 g/cm$^3$ and a melt index of 0.2 to 20 g/10 min.

The polymer composition of the present invention can be used to produce blown films, cast films, extrusion coatings and molded articles.

DETAILED DESCRIPTION OF THE INVENTION

All parts and percentages used in this application are by weight unless otherwise specified. Ambient or room temperature is approximately 25° C.

Component (A)(i) of the present invention is a linear low density polyethylene containing up to 20%, preferably 5 to 14% of a $C_{4-8}$ α-olefin. Preferably, said linear low density polyethylene has a density of from 0.89 to 0.94, and most preferably from 0.900 to 0.935 g/cm$^3$. The melt index (MIE) is preferably from 0.20 to 3 g/10 min., and most preferably from 0.20 to 1 g/10 min.

Component (A)(ii) of the present invention can be a copolymer of propylene with ethylene or a $C_4$–$C_8$ α-olefin having a propylene content of from 60 to 95%; or a copolymer of propylene with ethylene and $C_{4-8}$ α-olefin having an ethylene content of from 2 to 7% ethylene and a $C_{4-8}$ α-olefin content of from 2 to 8%.

The insolubles in xylene at room temperature of component (A)(ii) is greater than 70%, preferably greater than 75%, and most preferably greater than 85%.

The polyolefin composition (A), preferably, has an overall melt index (MIE) of 0.4 to 1.0 g/10 min. and a density of 0.905 to 0.912 g/cm$^3$.

The $C_{4-8}$ α-olefin of component (A)(i) and (A)(ii) includes 1-butene, 1-hexene, 1-octene, and 4-methyl-1-pentene. Preferably, said α-olefin of is 1-butene.

The polyolefin composition of Component (A) can be prepared with a polymerization process comprising two stages with one or more reactor in each stage, where in one stage component (A)(i) is prepared in one or more reactors, and in preceding or subsequent stage(s) component (A)(ii) is polymerized in one or more reactors. The order in which the components are made is not critical. However, it is preferred that the component (A)(ii) is prepared in the first stage.

The polymerization is conducted in gas-phase using separate fluid bed reactors in each stage and the same catalyst is used in all stages.

Hydrogen can be added as needed as a chain transfer agent for control of the molecular weight.

The reaction temperature for the polymerization of component (A)(i) and for the polymerization of component (A)(ii), can be the same or different, and is generally from 40° to 120° C., and preferably from 60° C. to 100° C.

The catalyst used in the polymerization comprises the reaction product of i) a solid catalyst component comprising a titanium compound containing at least one Ti-halogen bond supported on an activated magnesium halide and, optionally, an electron-donor compound, ii) a non-halogen containing Al-alkyl compound and, optionally, iii) an electron-donor compound.

Preferably the gas-phase polymerization is preceded by precontacting the catalyst with small quantities of olefin monomer, herein referred to as "prepolymerization", maintaining the catalyst in suspension in a hydrocarbon solvent, such as and polymerizing at a temperature from room temperature to 60° C. for a time sufficient to produce a quantity of polymer from 0.5 to 3 times the weight of the catalyst.

Particularly preferred are the catalysts comprising components having a regular morphology, such as spherical or spheroidal for example. Examples of said catalysts are described in U.S. Pat. No. 5,221,651, EP-A-553805, and EP-A-553806.

Component (B) of the present invention is a low density polyethylene, and can be any commercially available low density polyethylene having a melt index, as determined according to method ASTM D-1238, condition E, of from 0.2 to 20 g/20 min. and a density of from 0.916 to 0.925 g/cm$^3$. Preferably, the low density polyethylene has a melt index of from 0.2 to 10 g/10 min, most preferably from 0.2 to 2 g/10 min.

The polymer compositions of the present invention consist essentially of, preferably, from 99% to 95% of Component (A) and from 1% to 5% of Component (B), and most preferably from 98% to 95% of Component (A) and from 2% to 5% of Component (B).

The polymer composition of the present invention may also contain conventional additives, for example, stabilizers, such as antioxidants; extender oils, such as paraffinic and naphthenic oils; fillers, such as $CaCO_3$, talc and zinc oxide; antislip agents; antiblock agents; or flame retardants.

The polymer compositions of the invention can be prepared by blending components (A) and (B) in the molten state, in a single or twin screw extruder. The components of the composition can be fed directly into the extruder or can be pre-blended in the solid state. After blending, the compositions of the present invention can be formed into blown films on conventional blown film equipment. The compositions can be formed into a variety of shapes with cross-sectional thicknesses, gauge, for example 0.5 to 30 mils. Typical shapes include oriented or unoriented flat or tubular films or sheets, generally used for packaging, bags, irrigation tubing, inflatable bags, and other items, such as stretch films and laminated or multilayered films.

The present invention will be illustrated in greater detail with reference to the examples of the invention set forth below. The test samples and physical properties of the following working examples and comparative examples were prepared and measured according to the following methods:

| | |
|---|---|
| Density, g/cm$^3$ | ASTM D 1505 |
| Melt Index E (MIE) | ASTM D 1238, condition E |
| Melt Index F (MIF) | ASTM D 1238, condition F |
| Melt Index L (MIL) | ASTM D 1238, condition L |
| F/E | Melt Index E and Melt Index F ratio |
| Haze % | ASTM D 1003 |
| Dart Impact Test | ASTM D 1709 |
| Melting point | ASTM D 3418-82 |
| Gloss % | ASTM D 2457 |
| Elmerdorf Tear Strength (MD) Machine direction (CD) Cross (traverse) direction | ASTM 1922 |
| Polymer Composition | percentage by weight of the various monomers determined by way of I.R. |

Xylene insolubles are determined according to the following procedure:

2 g of polymer are dissolved in 250 cm$^3$ of xylene at 135° C. under agitation. After 20 minutes the solution is allowed to cool maintaining the agitation until the temperature reaches 25° C. After 30 minutes the insoluble polymer is allowed to precipitate and is separated by filtration. The solvent is removed from the solution by way of evaporation in nitrogen flow, and the residue is dried under vacuum at 80° C. until it reaches a constant weight. In this manner one calculates the percentage of polymer soluble in xylene at 25° C., and consequently the percentage of insoluble polymer.

Solid Catalyst Component

A) Preparation of $MgCl_2$/Alcohol Adduct

The solid catalyst component employed in the examples below is prepared as follows:

Into a reactor equipped with a stirrer and in an inert atmosphere, are introduced 28.4 g of $MgCl_2$, 49.5 g of anhydrous ethanol, 10 ml of vaseline oil ROL OB/30 and 100 ml of silicone oil having a viscosity of 350 cs. the mixture is heated to 120° C. and stirred until the $MgCl_2$ is dissolved. The hot reaction mixture is then transferred into a 1,500 ml vessel, equipped with a Ultra Turrax T-45 N stirrer, containing 150 ml vaseline oil and 150 ml of silicone oil. The temperature is maintained at 120° C. while stirring for approximately 3 minutes at 3,000 rpm. The mixture is then discharged into a 2 liter vessel, equipped with a stirrer, containing 1,000 ml of anhydrous n-heptane cooled to 0° C. The mixture is stirrer at a speed of 6 meters per second for approximately 20 minutes, keeping the temperature at 0° C. The particles obtained are recovered by filtration, washed with 500 ml of n-hexane and gradually heated, increasing the temperature from 50° C. to 100° C. for a time sufficient to reduce the alcohol content.

B) Solid Catalyst Preparation

The Mg alcohol adduct prepared above is transferred into a reactor equipped with a stirrer and containing 625 ml of $TiCl_4$ at 0° C., under stirring. The reactor is then heated to 100° C. for one hour. When the temperature is 40° C., diisobutylphthalate is added in such an amount that the Mg/phthalate molar ratio is 8.

The reactor contents are then heated to 100° C. for two hours, then the solid separates by sedimentation.

The hot liquid is removed by a siphon, 500 ml of $TiCl_4$ are added and the mixture is heated to 120° C. for an hour while stirring. The stirring is stopped and the solid is separated by sedimentation. The hot liquid is removed by siphon. The solid is washed with portions of n-hexane at 60° C. and then at room temperature.

General Operating Procedure

The polymerization runs are carried out by feeding a solid catalyst component prepared according to the method described above is fed into the precontacting reactor. To the same reactor are fed triethylaluminum (TEAL) and cyclohexylmethyldimethoxysilane electron donor, in amounts such that the weight ratio between TEAL and solid component is 4.95, and the weight ratio between TEAL and electron donor is 5. Propane is also fed to the precontacting reactor as an inert agent. The residence time is about 10.5 minutes. The product discharged from this reactor is fed to the prepolymerization reactor. The residence time in the latter is about 30 minutes, and the temperature is maintained at 22° C. The prepolymer is then transferred to the first gas-phase reactor. The reaction monomers, propylene, ethylene and butene, and hydrogen and propane are fed into this reactor. From this reactor the terpolymer produced is transferred to a gas-solid separation system which removes the unreacted monomers, and is then sent to the second gas-phase reactor were ethylene and butene monomers, hydrogen and propane are fed.

The operating conditions of the gas-phase reactors are as follows:

TABLE 1

|  | Ex. 1 | Ex. 2 | Ex. 3 |
| --- | --- | --- | --- |
| FIRST GAS-PHASE REACTOR |  |  |  |
| Temperature | 60° C. | 60° C. | 65° C. |
| Pressure, psi | 216 | 192 | 220.5 |
| Residence time, min. | 241 | 244 | 73 |
| % Moles of propylene ($C_3$) | 14.7 | 13.6 | 25.1 |
| % Moles of ethylene ($C_2$) | 0.45 | 0.45 | 0.50 |
| % Moles of butene-1 ($C_4$) | 1.53 | 1.54 | 1.0 |
| % Moles of propane | 82.53 | 82.24 | 75.2 |
| % Moles of hydrogen | 0.15 | 0.16 | 0.15 |
| % $C_3$ | 92.4 | 92.1 | 92.4 |
| % $C_2$ | 2.2 | 2.4 | 2.2 |
| % $C_4$ | 5.3 | 5.5 | 5.4 |
| MIL, g/10 min. | 12.9 | 13.75 | 9.9 |
| % Xylene insolubles | 88.8 | 86.9 | 90.9 |
| Melting Point | 133.7° C. | 131.2° C. | 158.7° C. |

TABLE 1-continued

|  | Ex. 1 | Ex. 2 | Ex. 3 |
| --- | --- | --- | --- |
| SECOND GAS-PHASE REACTOR |  |  |  |
| Temperature | 82° C. | 82° C. | 85° C. |
| Pressure, psi | 280 | 256 | 294 |
| Residence time, min. | 110 | 97 | 118 |
| % Moles of ethylene ($C_2$) | 22.01 | 21.85 | 37.5 |
| % Moles of butene-1 ($C_4$) | 7.98 | 7.97 | 10.9 |
| % Moles of propane | 57.49 | 58.71 | 38.2 |
| % Moles of hydrogen | 6.61 | 5.86 | 13.8 |
| THIRD GAS-PHASE REACTOR |  |  |  |
| Temperature | 83° C. | 82° C. | — |
| Pressure, psi | 281 | 255 | — |
| Residence time, min | 89 | 83 | — |
| % Moles of ethylene ($C_2$) | 38.6 | 38.1 | — |
| % Moles of butene-1 ($C_4$) | 22.3 | 22.9 | — |
| % Moles of propane | 25.0 | 26.2 | — |
| % Moles of hydrogen | 11.3 | 9.6 | — |
| FINAL PRODUCT |  |  |  |
| % $C_3/C_2/C_4$ | 14 | 14 | 14 |
| % LLDPE | 86 | 86 | 86 |
| MIE, g/10 min. | 1.10 | 0.59 | 1.1 |
| F/E | 31.3 | 30.7 | 30.5 |
| Density, g/cm$^3$ | 0.9093 | 0.9080 | 0.9085 |
| % Xylene insolubles | 80.0 | 80.1 | 81.0 |
| Melting Point | 124.3° C. | 124.2° C. | 123.5° C. |

EXAMPLE 4

A polymer composition according to the invention is prepared by mechanically blending (A) 97% of a polyolefin composition of Example 1 set forth above in Table 1, containing an additive package consisting of 347 ppm of Irganox 1076 octadecyl 3-(3', 5'-di-tert-butyl-4'-hydroxyphenyl)propanoate stabilizer, 627 ppm of Sandostab PEP-Q stabilizer, the main component of which is tetrakis-(2,4-di-tert-butyl-phenyl)- 4,4-biphenylene diphosphite, and 1160 ppm of calcium stearate, with (B) 3% of LDPE 501I low density polyethylene having a melt index of 2 g/10 min. and a density of 0.919 g/cm$^3$ available from Dow Chemical Company.

The blend prepared above is extruded on a grooved feed extruder, through a circular die, and blown into a film with a sufficient amount of air to provide a film of 1 mil thickness using the following equipment and processing conditions:

| Screw: | Compression ratio = 1:1 |
| --- | --- |
|  | Polyolefin barrier type |
|  | L/D ratio = 24:1 |
|  | Blow up ratio = 2.5:1 |
|  | Die gap: 80 mil |
| Extruder barrel profile: | 415° F. to 395° F. going from zone 1 to zone 14. |
| Melt Temperature: | 412° F. |
| Adapter and die temperatures: | 410° F.–415° F. |
| Die Diameter: | 9.5 inches |
| Output rate: | 220 lbs/hr. |

The properties of the resulting film are set forth in Table 2 below.

Example 5

A composition and blown film of the present invention was prepared according to the procedure of Example 4, except that 97% of a polyolefin composition (A) of Example 2 set forth above in Table 1 was used, containing an additive package consisting of 325 ppm of Irganox 1076 octadecyl 3-(3', 5'-di-tert-butyl- 4'-hydroxyphenyl) propanoate stabilizer, 429 ppm of Sandostab PEP-Q stabilizer, the main component of which is tetrakis-(2,4-di-tert-butyl-phenyl)-4, 4-biphenylene diphosphite and 1586 ppm of calcium stearate was used.

The properties of the resulting film are set forth in Table 2 below.

Control 1

A blown film was prepared according to the procedure and using the ingredients of Example 4, except that 100% of the polyolefin composition (A) was used.

The properties of the resulting film are set forth in Table 2 below.

Control 2

A blown film was prepared according to the procedure and using the ingredients of Example 5, except that 100% of the polyolefin composition (A) was used.

The properties of the resulting film are set forth in Table 2 below.

The data in Table 2 demonstrates the dramatic improvement in % haze in Examples 4 and 5 of the instant invention by blending only 3% LDPE with the instant polyolefin composition, as compared to the polyolefin composition alone in controls 1 and 2 which do not contain any LDPE.

TABLE 2

| Properties | C-1 | Ex. 4 | C-2 | Ex. 5 |
|---|---|---|---|---|
| Haze % | 43.7 | 6.4 | 22.1 | 7.4 |

Example 6

A composition and blown film of the present invention was prepared according to the procedure and using the ingredients of Example 5, except that 0.5% of Quantum 940 low density polyethylene (B) having a melt index of 0.22 g/10 min and a density of 0.919 g/cm³ was used.

The properties of the resulting film are set forth in Table 3 below.

Example 7

A composition and blown film of the present invention was prepared according to the procedure and using the ingredients of Example 5, except that 0.5% of a low density polyethylene (B) having a melt index of 8 g/10 min. and a density of 0.918 g/cm³ was used.

The properties of the resulting film are set forth in Table 3 below.

Example 8

A composition and blown film of the present invention was prepared according to the procedure and using the ingredients of Example 5, except that 1.0% of LDPE 501I low density polyethylene having a melt index of 2 g/10 min. and a density of 0.919 g/cm³.

The properties of the resulting film are set forth in Table 3 below.

Example 9

A composition and blown film of the present invention was prepared according to the procedure and using the ingredients of Example 4, except that 3% of Quantum 940 low density polyethylene having a melt index of 0.22 g/10 min. and a density of 0.919 g/cm³.

The properties of the resulting film are set forth in Table 3 below.

Example 10

A composition and blown film of the present invention was prepared according to the procedure and using the ingredients of Example 5, except that 3% of a low density polyethylene having a melt index of 8 g/10 min. and a density 0.918 g/cm³.

The properties of the resulting film are set forth in Table 3 below.

Example 11

A composition and blown film of the present invention was prepared according to the procedure and the ingredients of Example 5, except that 5% of LDPE 501I low density polyethylene having a melt index of 2 g/10 min. and a density of 0.919 g/cm³.

The properties of the resulting film are set forth in Table 3 below.

The data in Table 3 demonstrates significant improvement in % haze in the Examples 6–11 of the instant invention wherein the melt index and amount of low density polyethylene are varied.

TABLE 3

| Example | % Haze |
|---|---|
| C-2 | 22.1 |
| E-6 | 12.3 |
| E-7 | 17.7 |
| E-8 | 11.2 |
| E-9 | 9.0 |
| E-10 | 9.1 |
| E-11 | 5.7 |

In Table 4 below are optical and physical property comparisons of films produced from Example 4 and Example 5 of the instant invention, conventional linear low density polyethylene and mechanical blends of conventional linear low density polyethylene with low density polyethylene.

TABLE 4

| Composition | % Haze | % Gloss | Dart Impact |
|---|---|---|---|
| Ex. 4 | 6.9 | 62 | 141 |
| Ex. 5 | 7.4 | 60 | 135 |
| C-3 | 35 | 19 | 100 |
| C-4 | 14.4 | 46 | 91 |
| C-5 | 10 | 62 | 68 |
| C-6 | 16 | 39 | 139 |
| C-7 | 12 | 54 | 86 |
| C-8 | 8.4 | 60 | 86 |
| C-9 | 14.1 | 39.2 | 145 |

TABLE 4-continued

| Composition | % Haze | % Gloss | Dart Impact |
| --- | --- | --- | --- |

C-3 — Exxon 1001.52 linear low density polyethylene containing butene comonomer and having a melt index of 1 g/10 min. and a density of 0.918 g/cm$^3$.
C-4 — Exxon 1001.52 linear low density polyethylene containing butene comonomer having a melt index of 1 g/10 min. density of 0.918 g/cm$^3$, mechanically blended with 10% of LDPE 501I low density polyethylene having a melt index of 2 g/10 min. and density of 0.919 g/cm$^3$.
C-5 — Exxon 1001.52 linear low density polyethylene containing butene comonomer having a melt index of 1 g/10 min. and density of 0.918 g/cm$^3$, mechanically blended with 20% LDPE 501I low density polyethylene having a melt index of 2 g/10 min. and density of 0.919 g/cm$^3$.
C-6 — UCC 7028 linear low density polyethylene containing hexene comonomer having a melt index of 1 g/10 min. and a density of 0.918 g/cm$^3$.
C-7 — UCC 7028 linear low density polyethylene containing hexene comonomer having a melt index of 1 g/10 min. and density of 0.918 g/cm$^3$, mechanically blended with 10% of LDPE 501I low density polyethylene having a melt index of 2 g/10 min. and density of 0.919 g/cm$^3$.
C-8 — UCC 7028 linear low density polyethylene containing hexene comonomer having a melt index of 1 g/10 min. and density of 0.918 g/cm$^3$, mechanically blended with 20% LDPE 501I low density polyethylene having a melt index of 2 g/10 min. and density of 0.919 g/cm$^3$.
C-9 — Dowlex 2045.11 linear low density polyethylene containing octene comonomer and having a melt index of 1 g/10 min. and a density of 0.920 g/cm$^3$.

As it can be seen from the data in Table 4, films produced from Examples 4 and 5 of the invention clearly show a substantial reduction in haze as compared to films produced from C-3, C-6 and C-9 which contain only conventional linear low density polyethylene. Even when convention linear low density polyethylene is blended with low density polyethylene, as in C-4, C-5, C-7 and C-8, at least twice the amount of low density polyethylene used in the compositions of the present invention is needed to merely obtain a reduction in haze. Even then the reduction in haze is not even half of the amount of the reduction exhibited by the compositions of the present invention. Also the compositions of the present invention exhibit higher gloss and impact resistance then the conventional linear low density polyethylene and the blends thereof with low density polyethylene.

Example 12

A polymer composition according to the invention is prepared by mechanically blending (A) 97% of a polyolefin composition of Example 3 set forth above in Table 1, with (B) 1% of Shell 33 low density polyethylene having a melt index of 0.3 g/10 min. and a density of 0.919 g/cm$^3$ available from Shell Chemical Company.

The properties of the resulting film are set forth below in Table 5.

Example 13

A polymer composition according to the invention is prepared by mechanically blending (A) 97% of a polyolefin composition of Example 3 set forth above in Table 1, with (B) 2.5% of Shell 33 low density polyethylene having a melt index of 0.3 g/10 min. and a density of 0.919 g/cm$^3$.

The properties of the resulting blown film are set forth below in Table 5.

Example 14

A polymer composition according to the invention is prepared by mechanically blending (A) 97% of a polyolefin composition of Example 3 set forth above in Table 1, with (B) 1% of ENI Riblene GM 30 low density polyethylene having a melt index of 3.7 g/10 min. and a density of 0.919 g/cm$^3$.

The properties of the resulting blown film is set forth below in Table 5.

Example 15

A polymer composition according to the invention is prepared by mechanically blending (A) 97% of a polyolefin composition of Example 3 set forth above in Table 1, with (B) 2.5% of ENI Riblene GM 30 low density polyethylene having a melt index of 3.7 g/10 min. and a density of 0.919 g/cm$^3$.

The properties of the resulting blown film is set forth below in Table 5.

Example 16

A polymer composition according to the invention is prepared by mechanically blending (A) 97% of a polyolefin composition of Example 3 set forth above in Table 1, with (B) 1% of ENI Riblene MR 10 low density polyethylene having a melt index of 20 g/10 min. and a density of 0.914 g/cm$^3$.

The properties of the resulting blown film is set forth below in Table 5.

Example 17

A polymer composition according to the invention is prepared by mechanically blending (A) 97% of a polyolefin composition of Example 3 set forth above in Table 1, with (B) 2.5% of ENI Riblene MR 10 low density polyethylene having a melt index of 20 g/10 min. and a density of 0.914 g/cm$^3$.

The properties of the resulting blown film is set forth below in Table 5.

Control 10

A blown film was prepared using the composition of Example 3 only.

The properties of the resulting film is set forth below in Table 5.

TABLE 5

|  | % Haze | % Gloss @45° | Dart Test g/mil | Elmendorf Tear Strength TD | Elmendorf Tear Strength MD |
| --- | --- | --- | --- | --- | --- |
| C-10 | 42 | 18 | 7.2 | 3.4 | 2.4 |
| Ex. 12 | 20 | 39 | 7.1 | 3.5 | 2.0 |
| Ex. 13 | 15 | 47 | 6.5 | 3.8 | 1.6 |
| Ex. 14 | 22 | 38 | 7.3 | 3.8 | 2.0 |
| Ex. 15 | 15 | 46 | 6.5 | 4.0 | 1.8 |
| Ex. 16 | 19 | 40 | 7.2 | 3.9 | 2.3 |
| Ex. 17 | 14 | 50 | 7.1 | 4.2 | 1.9 |

A significant improvement in % haze and % gloss is seen in the compositions of the present invention as compared to the polyolefin composition not blended with LDPE, while retaining the tear strength properties.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A polymer composition consisting essentially of a blend of:
   (A) from 99.5 to 95%, by weight, of a polyolefin composition produced by sequential polymerization in at least two stages, consisting essentially of:
      (i) from 95 to 75%, by weight, of a linear low density polyethylene containing up to 20%, by weight, of a $C_4$–$C_8$ α-olefin, and having density of from 0.88 to 0.945 g/cm$^3$ and a melt index of from 0.1 to 10 g/min, and
      (ii) from 5 to 25%, by weight, of a copolymer of propylene with ethylene or a $C_4$–$C_8$ α-olefin containing from 60 to 95% propylene, or a copolymer of propylene with ethylene and a $C_4$–$C_8$ α-olefin containing from 80 to 96% propylene, from 2 to 10% ethylene and from 2 to 10% $C_4$–$C_8$ α-olefin, said copolymer having greater than 70% xylene insoluble content, wherein said polyolefin composition has a melt index of 0.1 to 5.0 g/10 min; and
   (B) from 0.5 to 5% by weight of a low density polyethylene having a density of 0.916 to 0.925 g/cm$^3$ and a melt index of 0.2 to 20 g/10 min.

2. The composition of claim 1, wherein Component (A) (i) is a linear low density polyethylene with a $C_4$ α-olefin.

3. The composition of claim 1, wherein the α-olefin Component (A) (ii) is a 1-butene.

4. The composition of claim 1, wherein (A) (ii) is a terpolymer of from 88 to 96% of propylene, from 2 to 8% ethylene and from 2 to 7% $C_4$–$C_8$ α-olefin.

5. The composition of claim 1, wherein the polyolefin composition (A) is present in an amount of from 99% to 95%, and the low density polyethylene (B) is present in an amount of from 1% to 5%.

6. A blown film of a polymer composition consisting essentially of a blend of:
   (A) from 99.5 to 95%, by weight, of a polyolefin composition produced by sequential polymerization in at least two stages, consisting essentially of:
      (i) from 95 to 75%, by weight, of a linear low density polyethylene containing up to 20%, by weight, of a $C_4$–$C_8$ α-olefin, and having density of from 0.88 to 0.945 g/cm$^3$ and a melt index of from 0.1 to 10 g/min, and
      (ii) from 5 to 25%, by weight, of a copolymer of propylene with ethylene or a $C_4$–$C_8$ α-olefin containing from 60 to 95% propylene, or a copolymer of propylene with ethylene and a $C_4$–$C_8$ α-olefin containing from 80 to 96% propylene, from 2 to 10% ethylene and from 2 to 10% $C_4$–$C_8$ α-olefin, said copolymer having greater than 70% xylene insoluble content, wherein said polyolefin composition has a melt index of 0.1 to 5.0 g/10 min; and
   (B) from 0.5 to 5% by weight of a low density polyethylene having a density of 0.916 to 0.925 g/cm$^3$ and a melt index of 0.2 to 20 g/10 min.

7. A cast film of the polymer composition of claim 1.

8. An extrusion coating of the polymer composition of claim 1.

9. The composition of claim 1, wherein component (A) (ii) is prepared in the first stage.

* * * * *